United States Patent Office 3,030,379
Patented Apr. 17, 1962

3,030,379
PROCESS FOR THE PRODUCTION OF CHLORINE-CONTAINING PIGMENTS OF THE PHTHALOCYANINE SERIES
Georg Geiger, Binningen, Switzerland, assignor to Sandoz Ltd., Basel, Switzerland, a Swiss firm
No Drawing. Filed Mar. 2, 1959, Ser. No. 796,228
Claims priority, application Switzerland Mar. 19, 1958
4 Claims. (Cl. 260—314.5)

Phthalocyanines, especially copper phthalocyanine, are valued as pigments because of their high brilliancy and good fastness properties. However they have the disadvantage of being obtained in a comparatively coarse crystalline form which is unusable for purposes of pigmentation. They must first be brought into a fine state of division before they can be applied as coloring matters. This can be accomplished by a variety of methods which are described in the appropriate literature; for example, dissolving in highly concentrated sulfuric acid and reprecipitation in water, or thorough grinding in presence of solid grinding assistants.

In the normal processes of pigment manufacture the unsubstituted copper phthalocyanine is obtained in a form which is not stable to solvents: upon contact with certain solvents, notably aromatic hydrocarbons, it is converted into the crystalline, coloristically worthless form and is hence unusable for many applications, e.g. the pigmentation of nitrocellulose lacquers. This unsatisfactory state of affairs is avoided when the crude copper phthalocyanine is brought into a fine state of division by one of the special process described in the literature.

By introducing one or more halogen atoms (Cl, Br) into the molecule, products are obtained which not only are of more greenish color with increasing halogen content, but also can be converted by the common method of reprecipitation from sulfuric acid into pigments which retain their finely divided form and full color strength in presence of organic solvents.

There is an extensive literature on the halogenation of phthalocyanines. The reaction media which have been cited for this purpose include sulfur dichloride (U.S. Patent 2,377,685), phthalic anhydride (U.S. Patent 2,195,984), aluminum chloride (U.S. Patent 2,247,752) and chlorosulfonic acid (U.S. Patent 2,662,085). A demerit common to all these methods is the fact that the halogenation product must first be isolated and then brought into a finely divided form in a subsequent operation by one of the known methods, e.g. dissolving in and reprecipitation from sulfuric acid.

It has now been found that these difficulties can be obviated and chlorine-containing pigments of the phthalocyanine series produced by direct chlorination in weak oleum at low temperatures with subsequent precipitation in water, upon which the pigments are obtained in finely divided form. For this purpose the crude copper phthalacyanine is dissolved in fuming sulfuric acid containing 0–20% of $SO_3$, and the solution treated with dry chlorine at low temperature, e.g. −10° C. to +20° C., but preferably 0–5° C. Chlorination is accelerated by an addition of one of the known halogen carriers, in particular iodine.

In this way it is possible to introduce into the phthalocyanine molecule any amount of chlorine up to 2 atoms. As soon as the desired degree of substitution is attained the sulfuric acid solution is run into 5 to 50 times its weight of water. The whole is maintained in vigorous movement by means of a suitable mixing device, the pigment being thereby precipitated in finely divided form. It is filtered off, neutralized by washing, and if necessary freed from minor impurities by extraction with a dilute alkali solution before being dried.

The blue to greenish blue pigments which are obtained are fully equal in color strength to the corresponding commercial products.

Unexpectedly, at most very little pigment is destroyed in the present process and no sulfonic acid groups gain access to the molecule. This was not anticipated for two reasons: first, copper phthalocyanine can be readily sulfonated in fuming sulfuric acid and, second, the phthalocyanines, especially in solution, are rapidly destroyed at elevated temperatures by oxidizing agents such as chlorine.

The process herein disclosed thus permits the production in finely divided form of pigments ranging in color from the blue of copper phthalocyanine to the greenish blue of dichlorocopper phthalocyanine. Moreover the pigments are stable to solvents without further treatment, provided that at least 1 atom of chlorine is introduced into the phthalocyanine molecule. Even at a chlorine content of less than 1 atom they show a limited stability to solvents; this means that such pigments can be used to color certain nitrocellulose lacquers, e.g. formulations containing a low percentage of aromatic solvents or of limited storage stability, though at the same time partial crystallization of the pigment occurs when it is heated in a solvent such as toluene.

The finely divided pigments of the phthalocyanine series which are obtained by the present process are suitable for the mass dyeing of manufactured fibers, e.g. viscose rayon and fiber-forming polymers (cellulose esters, polyacrylonitrile) in solution in organic solvents (acetone, dimethylformamide), for the pigmentation of plastics, synthetic resins, e.g. on the basis of polyvinyl chloride, polyvinyl acetate, polystyrene, polyethylene and polyamide, paint and lacquer media (nitrocellulose and synthetic resins), and printing ink vehicles, for the dyeing and printing of paper, and for textile printing.

The dyeings and colorations produced by the pigments in these materials are very fast to light and wet agencies, and free from migration in plastic materials (polyvinyl chloride) containing plasticizers.

In the following examples the parts and percentages are by weight and the temperatures in degrees centigrade.

*Example 1*

240 parts of copper phthalocyanine are added with stirring to 1440 parts of sulfuric acid monohydrate at a temperature below 60°. After cooling to 0–5°, 150 parts of 25% oleum followed by 0.8 part of iodine are added. A jet of chlorine is directed through the solution, the rate of addition of the chlorine being about 5 parts per hour. After 7–10 hours a chlorine content of 5.8% is indicated in a sample. Air is injected, causing the excess chlorine to be blown out of the solution. The reaction mass is then heated to 60° and run into 10,000 parts of water with thorough stirring. The precipitated pigment is filtered with suction, neutralized by washing with water, and added to 3000 parts of water. The suspension is made alkaline with about 20 parts of 30% sodium hydroxide solution, stirred for 15 minutes at 90–95°, and filtered with suction; the filtrate is washed with water until of neutral reaction and then dried. The yield is 240–250 parts of a blue powder which contains 5.8% of chlorine but no sulfur.

Typical lacquer-making methods for use with this pigment are given below.

Nitrocellulose lacquer:
    1 part of the pigment of the above example,
    2 parts of titanium dioxide,
    15 parts of nitrocellulose
    20 parts of a 60% solution of a non-drying alkyd resin in toluene, and
    3 parts of tricresyl phosphate are ground in a ball mill for 24 hours. The thick blue mass is diluted to spraying consistency (1:10) with a mixture of solvents containing 100 parts of toluene, 40 parts of isobutylmethyl-ketone, 20 parts of butyl acetate, 20 parts of butyl alcohol, 16 parts of ethyl acetate and 4 parts of ethyl lactate. The lacquer is applied by spraying and gives blue coatings which are fast to light and wet agencies and show good permanency under outdoor exposure conditions.

A portion of the ready-to-use lacquer is stored in a closed container for 72 hours at 60–70°. After this time it is allowed to cool and then sprayed. No loss of color strength or difference of tone can be seen in the coating when compared with a spray-coating of the freshly prepared lacquer.

Urea lacquer:
    2.6 parts of a 60% solution of a urea resin (Beckamin P138) in xylene-butanol,
    4.0 parts of a 60% solution of a non-drying alkyd resin in toluene,
    2.6 parts of xylene,
    0.8 part of ethylglycol acetate, and
    1.0 part of the pigment of Example 1 are ground in a ball mill for 24 hours to give a thick liquid paste which is diluted with a mixture of 24 parts of xylene and 7 parts of ethylglycol acetate. The blue-colored lacquer is applied to aluminum sheet and air-dried; the coating is fast to light, wet agencies, and weathering.

*Example 2*

The procedure described in Example 1 is followed, except that chlorination is carried out at 10–20° until a sample is found to have a chlorine content of 11%.

0.1 part of the resulting pigment is wetted with 1 part of dioctyl phthalate and pasted with a spatula. The paste is mixed with 100 parts of a previously prepared mixture of 60 parts of polyvinyl chloride, 40 parts of dioctyl phthalate and the commonly used stabilizing agents. The whole mixture is gelatinized on a roller mill at 140–150°. The mass is fed into a machine where it is pressed between polished plates heated to about 140° to form plastic sheets of a blue color which shows excellent light fastness.

When the pigmented sheet is placed between sheets of an uncolored plastic composed of 70° of polyvinyl chloride and 30% of dioctyl phthalate and stored for 72 hours at 70°, the pigment does not migrate into the uncolored sheets.

A mixture of 100 parts of "Cellit," 400 parts of acetone and 1 part of the pigment of Example 2 is ground in a ball mill until the film formed by pouring a sample onto a glass plate is found to contain no particles larger than $1/\mu$ when viewed in the microscope. The tread obtained by spinning has a blue shade that is outstandingly fast to light and withstands all the normal textile manufacturing and finishing processes without loss of depth.

Having thus disclosed the invention what I claim is:

1. A process for the production of copper phthalocyanine pigments containing up to two chlorine atoms, comprising reacting chlorine-free copper phthalocyanine with chlorine in concentrated sulfuric acid having a content of from 0% to 20% by weight of free sulfur trioxide at temperatures ranging from −10° C. to +20° C. and introducing the reaction mass into water.

2. Process according to claim 1, wherein the chlorination is carried out in presence of iodine as halogen carrier.

3. Process according to claim 1, wherein the chlorination is continued until at most 2 chlorine atoms are introduced into the pigment molecule.

4. A process for the production of low-chlorinated copper phthalocyanine pigments, comprising reacting chlorine-free copper phthalocyanine with chlorine in the presence of concentrated sulfuric acid having a content of from 0% to 20% by weight of free sulfur trioxide at temperatures ranging from −10° C. to +20° C., removing excessive chlorine, and stirring the reaction mass into water and separating the resulting precipitate of finely divided copper phthalocyanine containing up to two chlorine atoms.

References Cited in the file of this patent

UNITED STATES PATENTS

| | | |
|---|---|---|
| 2,662,085 | Holtzman et al. | Dec. 8, 1953 |
| 2,862,929 | Caliezi et al. | Dec. 2, 1958 |

UNITED STATES PATENT OFFICE
CERTIFICATE OF CORRECTION

Patent No. 3,030,379            April 17, 1962

Georg Geiger

It is hereby certified that error appears in the above numbered patent requiring correction and that the said Letters Patent should read as corrected below.

Column 1, line 58, for "acyanine" read -- ocyanine --; column 4, line 12, for "1½µ" read -- 1µ --; same line 12, for "tread" read -- thread --.

Signed and sealed this 30th day of October 1962.

(SEAL)
Attest:

ERNEST W. SWIDER
Attesting Officer

DAVID L. LADD
Commissioner of Patents